(12) United States Patent
Ragot et al.

(10) Patent No.: US 12,257,889 B2
(45) Date of Patent: Mar. 25, 2025

(54) LOCKING ARRANGEMENT FOR A MOUNTING SYSTEM FOR AN ENERGY STORAGE SYSTEM ON A VEHICLE

(71) Applicant: Volvo Truck Corporation, Gothenburg (SE)

(72) Inventors: Sebastien Ragot, Gothenburg (SE); Jonatan Hörder, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 305 days.

(21) Appl. No.: 17/921,506

(22) PCT Filed: May 5, 2020

(86) PCT No.: PCT/EP2020/062410
§ 371 (c)(1),
(2) Date: Oct. 26, 2022

(87) PCT Pub. No.: WO2021/223847
PCT Pub. Date: Nov. 11, 2021

(65) Prior Publication Data
US 2023/0173904 A1   Jun. 8, 2023

(51) Int. Cl.
*B60K 1/04* (2019.01)
(52) U.S. Cl.
CPC ..................................... *B60K 1/04* (2013.01)
(58) Field of Classification Search
CPC .............. B60K 1/04; B60K 2001/0438; B60K 2001/0461; Y02E 60/10; H01M 2220/20; H01M 50/204; H01M 50/244; H01M 50/249; H01M 50/262; B60L 2200/36; B60L 50/66; B60L 53/80; Y02T 10/70; Y02T 10/7072

See application file for complete search history.

(56) References Cited

U.S. PATENT DOCUMENTS

| | | | | |
|---|---|---|---|---|
| 10,998,589 | B2 * | 5/2021 | Chen | H01M 50/262 |
| 11,359,410 | B2 * | 6/2022 | Zhang | E05B 47/0002 |
| 11,364,781 | B2 * | 6/2022 | Zhang | B60L 50/64 |
| 2012/0321381 | A1 * | 12/2012 | Ohgitani | B60K 1/04 |
| | | | | 403/376 |

(Continued)

FOREIGN PATENT DOCUMENTS

| CA | 3110459 A1 * | 2/2020 | ............... B60K 1/04 |
|---|---|---|---|
| CN | 103121442 B | 8/2015 | |
| CN | 105291799 A | 2/2016 | |

(Continued)

OTHER PUBLICATIONS

CA-3110459-A1 English Translation (Year: 2020).*

(Continued)

*Primary Examiner* — James A Shriver, II
*Assistant Examiner* — Michael T. Walsh
(74) *Attorney, Agent, or Firm* — Withrow & Terranova, PLLC

(57) ABSTRACT

A mounting system for mounting of an energy storage system to a frame of a vehicle. The mounting system comprises an energy storage system bracket assembly, a frame-mounted bracket assembly, and a locking mechanism comprising a sliding lock assembly translatable between an open and a closed position locking the energy storage system.

11 Claims, 8 Drawing Sheets

(56) References Cited

U.S. PATENT DOCUMENTS

2013/0175829 A1    7/2013  Kim et al.
2018/0201110 A1*   7/2018  Yin ..................... F16B 35/045

FOREIGN PATENT DOCUMENTS

| CN | 105291799 B | * | 1/2018 | |
|---|---|---|---|---|
| CN | 208101948 U | | 11/2018 | |
| CN | 109686879 A | | 4/2019 | |
| JP | 2014118694 A | * | 6/2014 | |
| JP | 2014120232 A | * | 6/2014 | |
| WO | WO-2005053061 A2 | * | 6/2005 | .......... H01M 16/003 |

OTHER PUBLICATIONS

CN-105291799-B English Translation (Year: 2018).*
JP-2014118694-A English Translation (Year: 2014).*
JP-2014120232-A English Translation (Year: 2014).*
WO-2005053061-A2 English Translation (Year: 2005).*
International Search Report and Written Opinion for International Patent Application No. PCT/EP2020/062410, mailed Sep. 16, 2020, 13 pages.

* cited by examiner

LOCKING ARRANGEMENT FOR A MOUNTING SYSTEM FOR AN ENERGY STORAGE SYSTEM ON A VEHICLE

This application is a 35 USC 371 national phase filing of International Application No. PCT/EP2020/062410, filed May 5, 2020, the disclosure of which is incorporated herein by reference in its entirety.

TECHNICAL FIELD

The invention relates to a mounting device for energy storage systems on a vehicle and in particular, a quick sliding lock mechanism.

The invention can be applied in heavy-duty vehicles, such as trucks, buses, and working machines. Although the invention will be described with respect to a tractor unit, the invention is not restricted to this particular vehicle, but may also be used in other vehicles such as heavy-duty construction equipment.

BACKGROUND

Recent development in the automotive area has been focusing on electrical drive solutions; this is true also for heavy-duty vehicles such as trucks, buses and construction equipment. This drives the need for new solutions around driveline, energy storage, construction and assembly of these types of vehicles. Generally, heavy-duty vehicles are often specially designed on a case-by-case basis or have a number of different accessories installed on the vehicles depending on functionality and type of vehicle. For instance, energy storage systems, like for instance batteries, are generally heavy and take up large volumes in automotive applications. This is especially true for heavy-duty vehicles operating for long hours each day and with heavy loads. Furthermore, these types of vehicles since they concern smaller manufacturing series, often specially designed solutions and heavy installations, need to be easily assembled during manufacturing but also easily serviced and repaired.

Another aspect of mounting of energy storage systems, such as batteries, or other accessories are safety concerns. There is a concern that different parts mounted in or on the vehicle are securely mounted and behave in a predictable manner if the vehicle is subjected to an accident. Thus, there is a need for secure handling of energy storage systems and the like.

Thus, there is a need for effective and reliable solutions for mounting of different parts of the vehicle during manufacturing and for servicing the vehicle. The mounting solutions often used today provide cumbersome processes and are quite complex in mounting procedures and mounting arrangements. For instance, CN208101948U discloses a kind of battery cases for an electric transporting vehicle with slide handler, including cabinet mounting bracket, sliding equipment and battery case.

SUMMARY

It is an object of the present invention to obviate at least some of the above disadvantages and provide improved system, device, and method for mounting of energy storage systems or other accessory units to a vehicle frame. Thus, an object of the invention is to provide a system and a method for mounting an energy storage system or accessory unit to a frame of a heavy-duty vehicle. According to a first aspect of the present invention, this object is achieved by a system according to claim 1, in which a mounting system for mounting at least one energy storage system, ESS, to a vehicle frame is provided. The mounting system comprises at least one sliding lock assembly translatable between a closed position and an open position, the sliding lock assembly comprising at least one opening arranged to receive an ESS bracket assembly when in the open position; and at least one frame-mounted bracket arranged to receive at least one ESS bracket assembly attached to each ESS and to lock the ESS bracket assembly in a horizontal direction. Wherein, when the sliding lock is positioned in the open position, the ESS bracket assembly is translatable into a locking position in relation to the at least one frame-mounted bracket and when the ESS bracket assembly is in the closed position in the frame-mounted bracket, the sliding lock assembly can be moved into a closed and locking position locking the ESS bracket assembly in a vertical direction. The use of the sliding lock assembly provides a secure and efficient locking mechanism.

The at least one frame-mounted bracket may comprise a receiving cavity arranged to receive a protruding bushing of the ESS bracket assembly. This has the advantage of restricting the movement in a horizontal direction of the ESS.

Furthermore, the system may comprise an actuator moving the sliding lock assembly between the closed and open positions. The actuator may be at least one of an electrically driven, hydraulically driven, or pneumatically driven actuator type.

Furthermore, the system may comprise a control unit for operating the actuator. The actuator may alternatively be a manually driven actuator. Moving the sliding lock plate between the closed and open positions with an actuator is advantageous for the operator in providing a safer and more controlled operation of the sliding lock assembly. The use of a control unit has the advantage of providing remote operation of the sliding lock plate.

The sliding lock assembly may comprise a plurality of openings each arranged to receive an ESS bracket assembly when in an open position. In this way, a plurality of ESS bracket assemblies and frame-mounted bracket assemblies may be locked in one operation.

The frame-mounted bracket assembly may comprise a guiding arrangement arranged to receive the sliding lock assembly for steering the sliding lock plate and restricting movement in other directions. The sliding lock assembly may further comprise at least one guiding unit arranged adjacent each opening of the sliding lock assembly and wherein the at least one guiding unit is arranged to fit securely in the guiding arrangement of the frame-mounted bracket. The guiding arrangement provide an advantageous solution for steering and restricting movement of the sliding lock plate in relation to the frame-mounted bracket assembly.

In another aspect of the present solution, a vehicle comprising the mounting system is provided.

In yet another aspect of the present solution, a method for mounting at least one energy storage system, ESS, to a vehicle frame is provided. The method comprising steps of placing the energy storage system, ESS, under the vehicle frame, the ESS comprising at least one ESS bracket assembly, sliding a sliding lock assembly into an open position, the sliding lock assembly comprising at least one opening arranged to receive the ESS bracket assembly when in an open position, moving the ESS bracket assembly into the opening of the sliding lock, moving the ESS sideways into a position above a frame-mounted bracket, lowering ESS so the ESS bracket assembly rests on the frame-mounted bracket, wherein the frame-mounted bracket restrict the movement of the ESS bracket assembly in a horizontal direction, and translating the sliding lock assembly into a closed position locking the ESS bracket assembly in a vertical direction.

By the provision of the system and method according to the present invention, which comprises the sliding lock assembly together with the bracket assemblies of the ESS and the frame, the advantage of a quick, efficient, and secure mounting of the ESS to the vehicle frame is provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
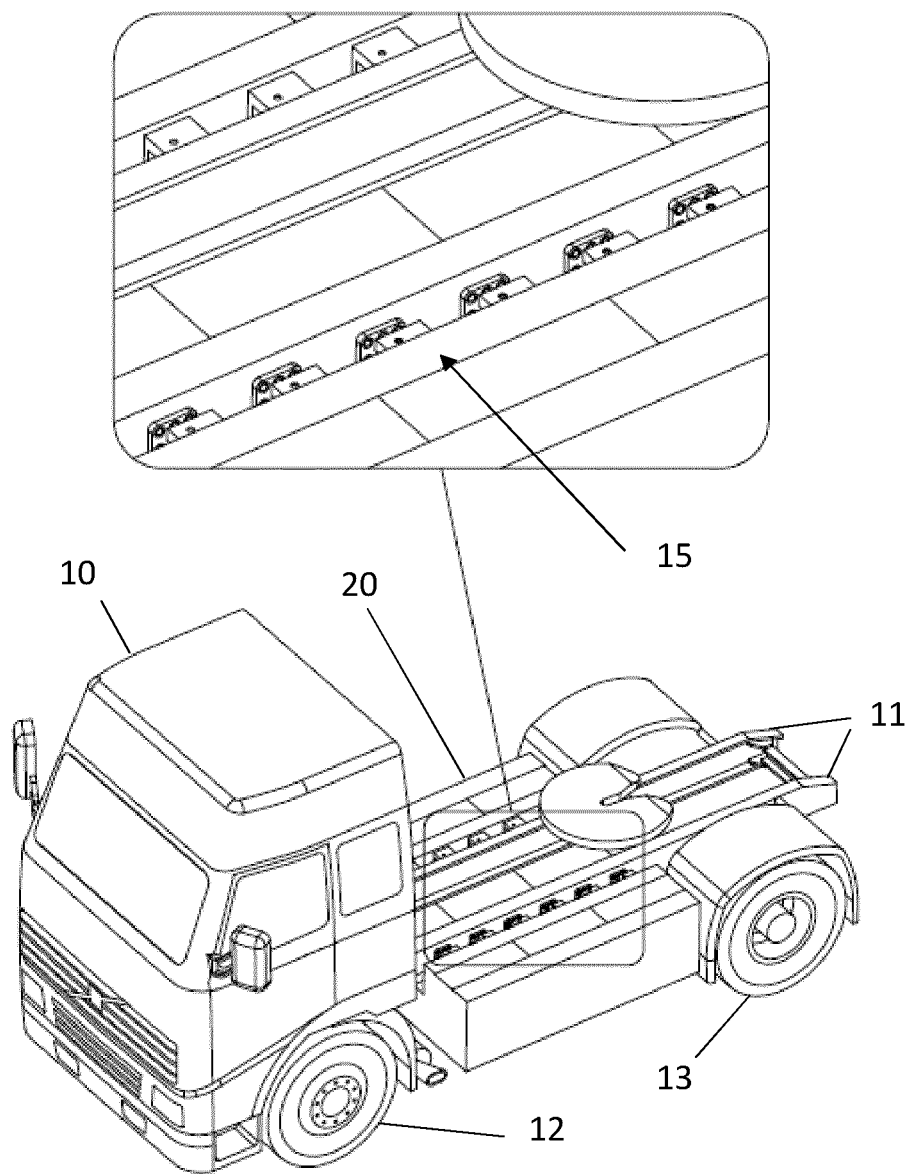
FIG. 1 is a schematic illustration of a vehicle with a mounting system.

In FIG. 1, reference numeral 10 generally shows a heavy-duty vehicle. The exemplified vehicle is shown as a truck arranged for receiving a trailer but other types of trucks, buses, working machines, and construction equipment may be applicable for the present solution. The vehicle in this case is equipped with an accessory unit 20 attached to a frame 11 of the vehicle. The accessory unit is located between the front wheels 12 and rear wheels 13 of the vehicle and mounted to the frame 11 with a mounting system 15. It should be noted that the mounting system may be located at other locations of the vehicle different from between the front and rear wheels. The accessory unit 20 may for instance be an energy storage system (ESS) such as a battery pack 20.

Figure 2:
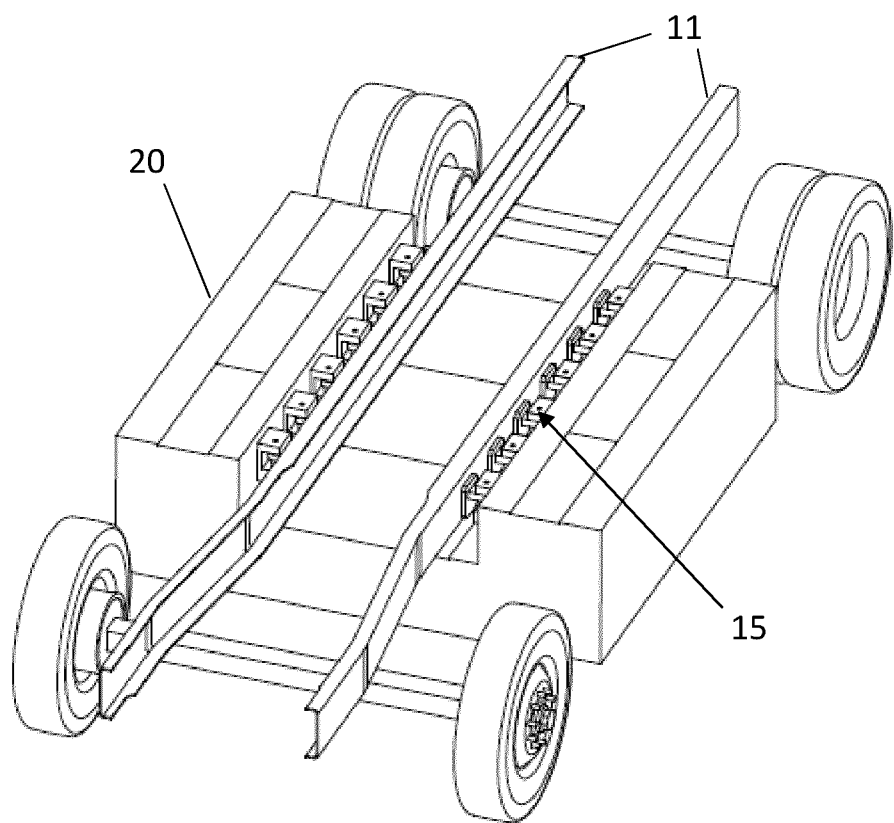
FIG. 2 is a detailed schematic of a vehicle frame with the mounting system.
Figure 3:
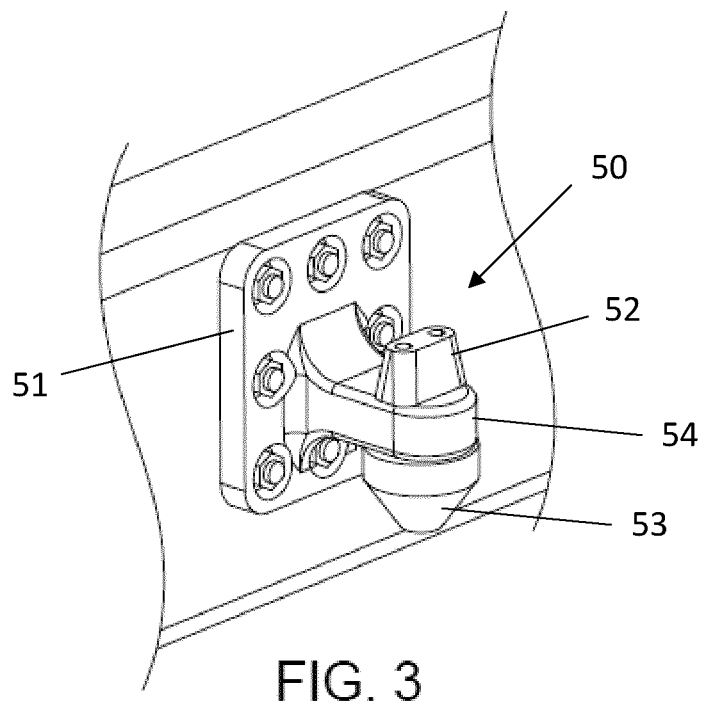
FIG. 3 is a schematic 3D view of a part of the mounting system in detail.

FIG. 2 shows a more detailed view of the energy storage system mounted to the frame 11 using the mounting system 15. The ESS may comprise one single module or a plurality of modules attached adjacent each other together forming a continuous unit. The mounting system 15 comprises three main parts in which one is shown in FIG. 3, illustrating an energy storage system (ESS) bracket assembly 50. The ESS bracket assembly comprises a bracket frame 51 arranged to be fasted to the ESS, a central ESS bracket holder 54 attached to or integrated with the ESS bracket frame 51, a bump stop 52, and a cushion 53. The bump stop can be designed in a stiff material such as metal or a softer material such as rubber or plastic material. The cushion when fitted in a receiving cavity of the frame-mounted assembly restrict the movement of the ESS in a horizontal direction. The cushion can be made of a stiff material such as metal or a softer material such as rubber or plastic material.

Figure 4:
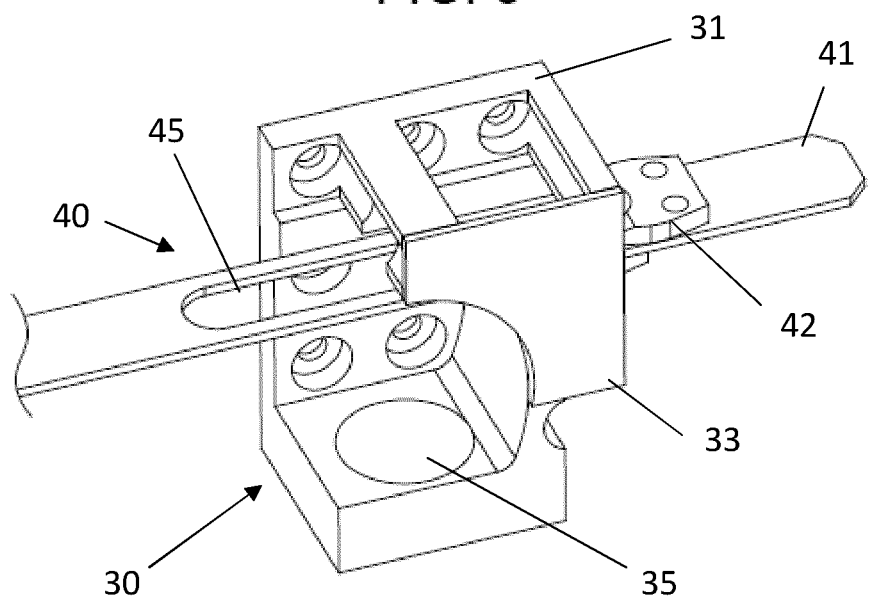
FIG. 4 is a schematic 3D view of a part of the mounting system in detail.

The ESS bracket assembly is arranged to be placed on a frame-mounted bracket assembly 30 arranged to be fitted on the vehicle frame 11; the frame-mounted bracket assembly is shown in FIG. 4. The frame-mounted bracket assembly comprises a support structure 31 arranged to be fitted on the frame 11 of the vehicle 10 for instance with one or more screws or other suitable fastening elements. Furthermore, the support structure may comprise a lock plate 33, and a receiving cavity 35 arranged to receive the cushion 53 of the ESS bracket assembly 50. The structure of the receiving cavity 35 is preferably arranged to receive the cushion 53 so the cushion rests securely in the receiving cavity. This may be provided for instance if the cushion has a conical shape, the receiving cavity may be inversely conical. More generally, the cushion 53 comprises a protruding shape, such as a conical, spherical, or convex shape, and the receiving cavity 35 comprises an inwardly receiving shape, such as a concave or inverted conical shape. The lock plate 33 provide steering and locking support for restricting the movement of a sliding lock assembly 40 in a direction perpendicular from the longitudinal direction of the sliding lock assembly.

Figure 8:
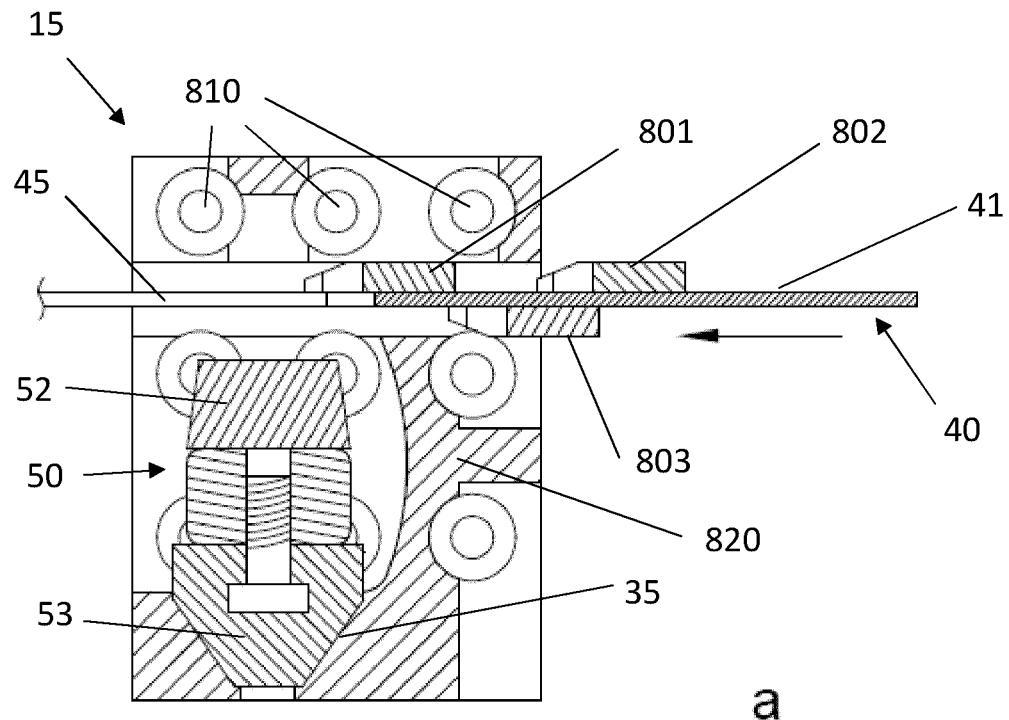
FIG. 8 are side views of the mounting system.
Figure 8:
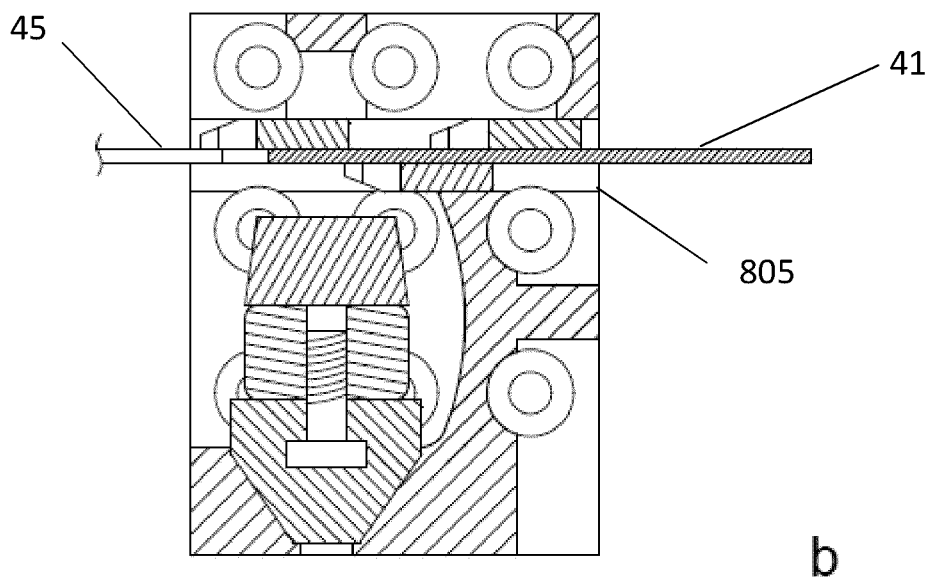

The frame-mounted bracket assembly 30 is further arranged to receive a sliding lock assembly 40 comprising a sliding lock plate 41, at least one guiding unit 42, 801, 802, 803, and at least one opening 45 arranged to receive the bump stop 52 when the sliding lock assembly is in an open position. The sliding lock assembly 40 is translatable in a longitudinal direction of the vehicle but is restricted in movement in the other directions by the support structure 31 and the lock plate 33. The at least one guiding unit 42, 801, 802, 803 is arranged to be guided by a guiding arrangement 805 of the frame-mounted bracket assembly as seen in FIG. 8. The bump stop 52 will encounter the sliding lock plate in a vertical direction when the sliding lock assembly is in a closed position, and thus be restricted in the vertical direction. Preferably, the bump stop 52 fits with some suitable margin in the opening 45 of the sliding lock assembly when the sliding lock assembly is in an open position and that the opening then extends into the region of the frame-mounted bracket assembly in order to translate the bump stop into the frame-mounted bracket assembly 30.

Figure 5:
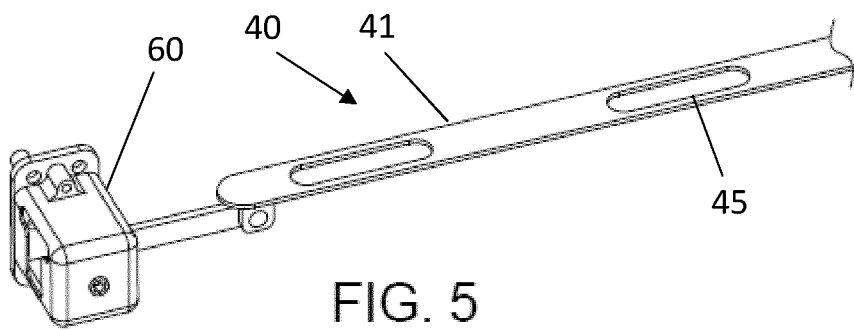
FIG. 5 is a schematic 3D view of a sliding lock for the mounting system.

Now referring to FIG. 5, the sliding lock assembly 40 may be connected to an actuator 60 that actuates the sliding lock plate 41 between an open and a closed position. The actuator may comprise a manual operation where an operator manually operates the actuator for instance by turning a crank (not shown), screwdriver, or other means for mechanically operating the actuator, which is translated into a linear movement of the lock plate. Optionally, the actuator is electrically driven and controlled, pneumatically driven, or hydraulically driven. A control station for controlling the actuation may be placed at any suitable location of the vehicle, for instance in a control box located close to the ESS, at some location on the outside of the vehicle for suitable operation and easy access for the operator, or in the vehicle cabin. In this way, the operator can open or lock the mounting system remotely conveniently and safely.

Figure 6:
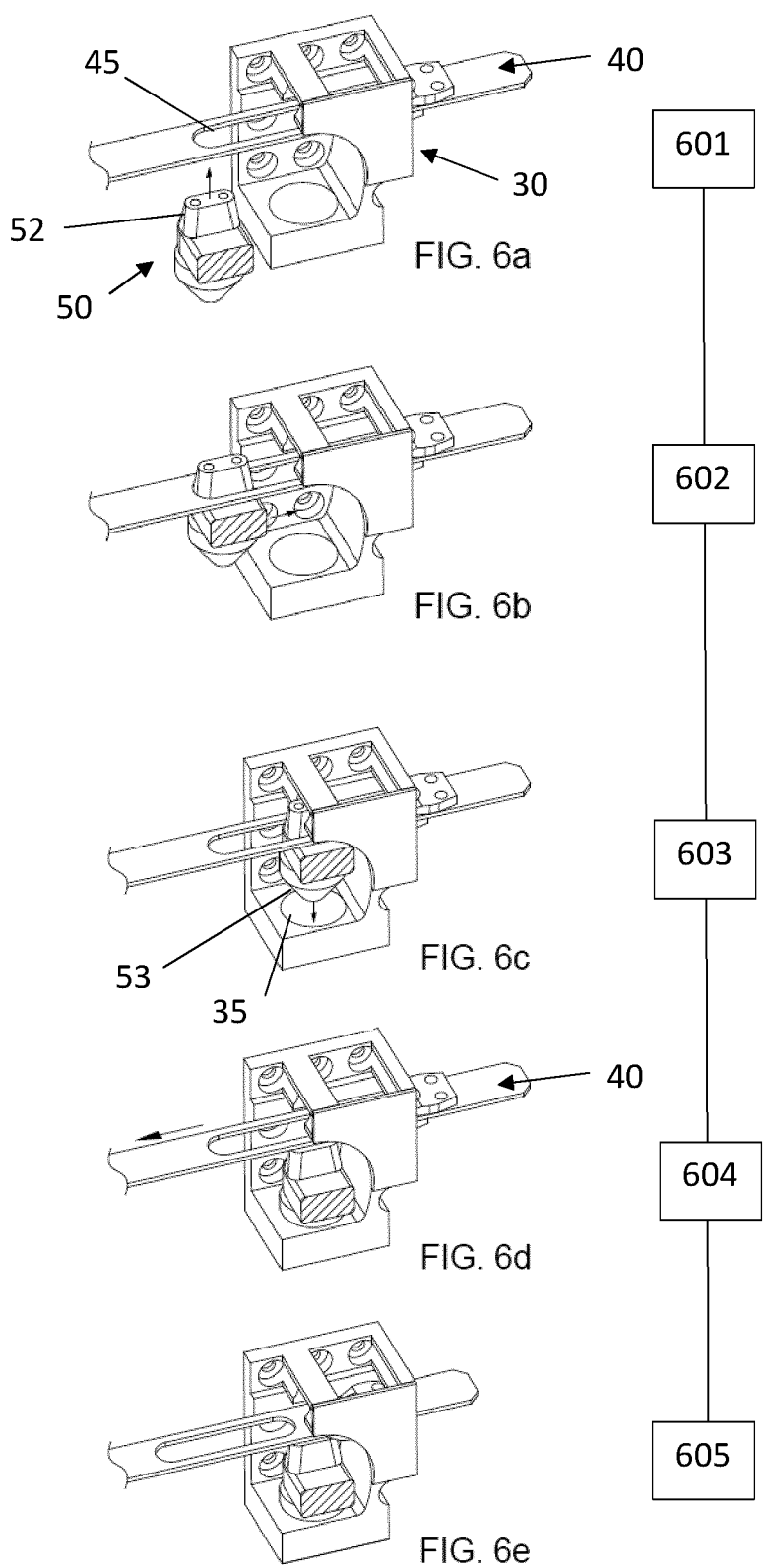
FIG. 6 is a schematic mounting procedure of an accessory unit using the mounting system.

When the ESS (or other accessory unit) is to be mounted (and dismounted), the operation is described in relation to FIGS. 6a to 6e, in steps 601-605 below. In FIG. 6, only part of the ESS bracket assembly is shown, i.e. only part of the central ESS bracket holder, the bump stop 52, and the cushion 53; however, it should be understood that the ESS bracket assembly is attached to the ESS during this operation. When the ESS is to be mounted to the vehicle it is placed under the vehicle and then raised into a mounting position as will be described below in the following steps.

In a first step 601, starting the operation of mounting of the ESS to the vehicle, the sliding lock assembly 40 is translated into an open position, i.e. the opening 45 is placed in relation to the frame-mounted bracket assembly 30 in such a way that the bump stop 52 will fit in the opening 45 and can be translated into the frame-mounted bracket assembly region as seen in step 602. Thereafter in step 603, the ESS bracket assembly 50 is lowered so as the cushion 53 is set to rest in the cavity 35 of the frame-mounted bracket assembly 30. The cavity restricts the movement of the cushion and in turn the ESS in a horizontal direction. In step 604, the sliding lock 40 is translated into a closed and locking position, i.e. the opening 45 is moved outside the frame-mounted bracket region. In step 605, the ESS bracket assembly is restricted in a direction vertically, i.e. the bump stop 52 is locked underneath the sliding lock plate 41.

Figure 7:
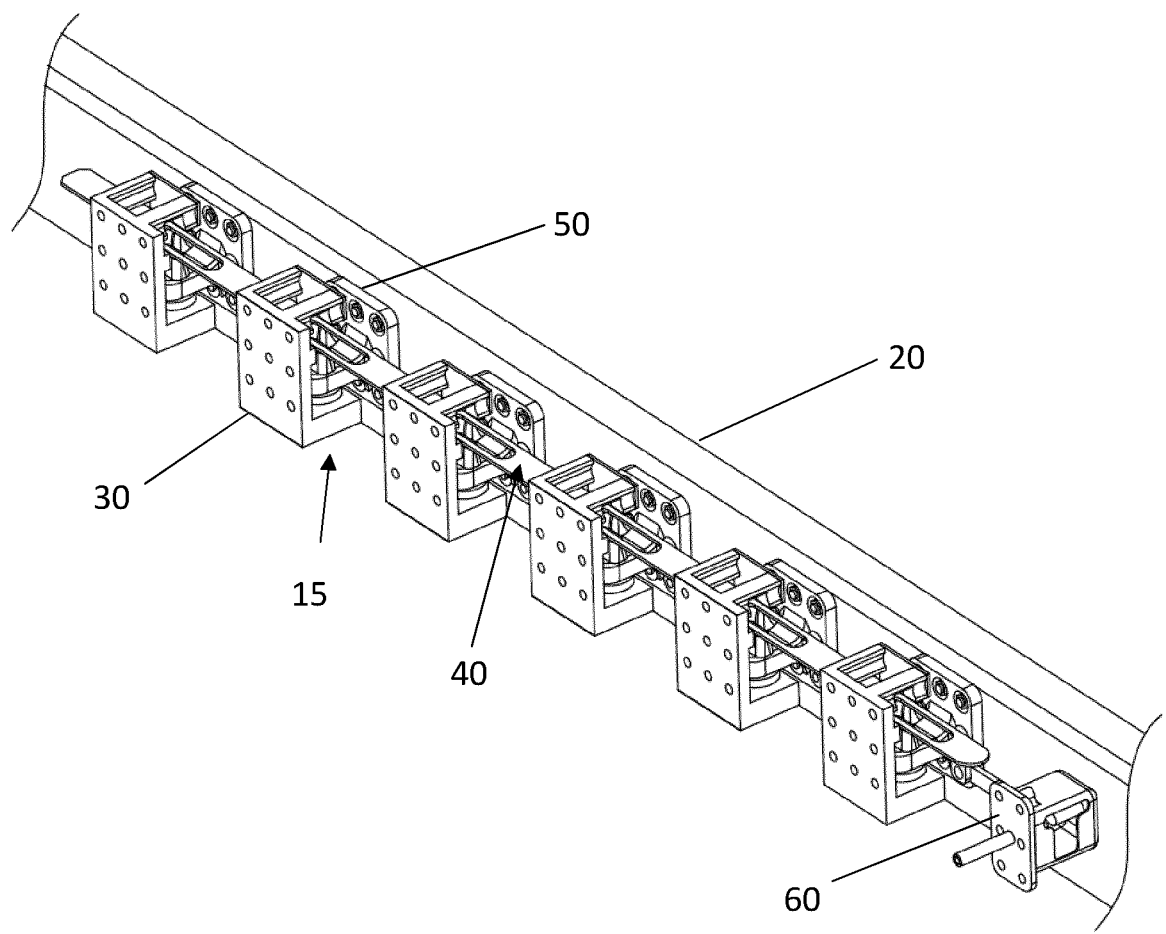
FIG. 7 is a 3D overview of the mounting system.

As illustrated in FIG. 7, the mounting system 15 may comprise a plurality of frame-mounted bracket assemblies 30 and a plurality of ESS bracket assemblies with one common sliding lock assembly 40 locking each ESS bracket assembly at the same time when translated into the closed locking position.

Figure 9:
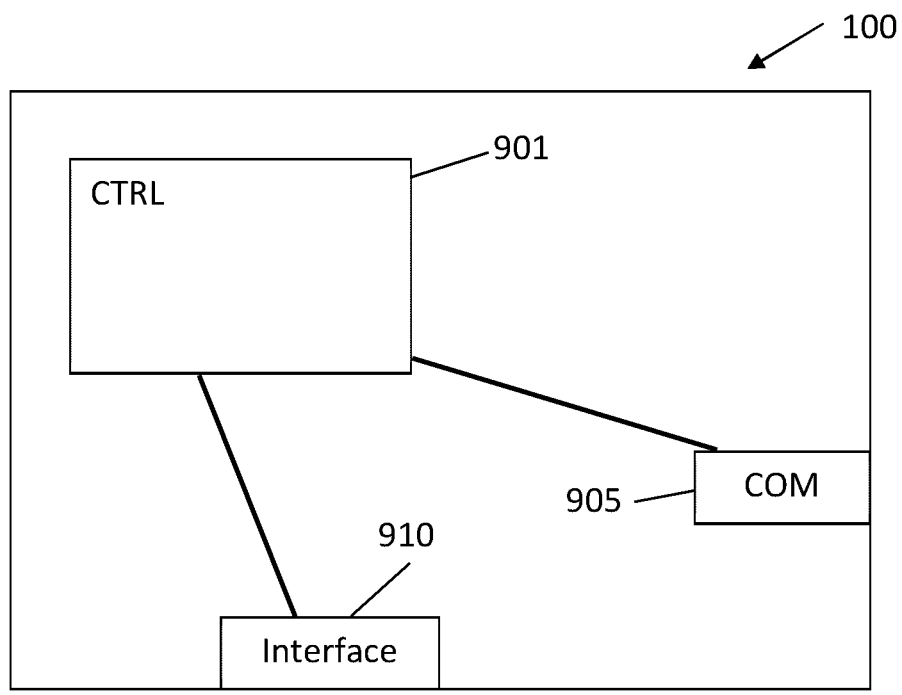
FIG. 9 is a schematic block diagram of a control unit.

FIG. 8 gives a more detailed view of the mounting system in a sectional side view. The frame-mounted bracket assembly 30 is attached to the frame using at least one screw 810 or similar fastening elements. The frame-mounted bracket assembly comprises a support structure 820 of which the cavity 35 is an integral part. The sliding lock assembly 40 is translated in the frame-mounted bracket assembly in a guiding arrangement 805 and the sliding lock assembly 40 optionally comprises one or more guide units 801, 802, 803 comprising a resilient material, for instance with a predetermined friction coefficient, for smooth gliding in the guiding arrangement. In FIG. 9a, the opening 45 is set in the open position where the opening is provided in the frame-mounted bracket assembly region, i.e. the bump stop of the ESS bracket assembly can be moved in an upward direction and translated outwardly away from the frame-mounted bracket or inwardly into the frame-mounted bracket. In FIG. 9b, the opening 45 is set in the closed position, i.e. the opening is outside the frame-mounted bracket assembly region and the bump stop 51 of the ESS bracket assembly cannot be moved vertically and out from the frame-mounted bracket assembly since the lock plate 41 will hinder the movement in the direction towards the lock plate 41.

It should be noted that the invention has been described in view of the ESS bracket assembly (and the ESS) is moved in or out of the mounting position but alternatively, the ESS bracket assembly and frame-mounted assembly may be interchanged so the ESS bracket assembly construction is mounted to the frame of the vehicle and the frame-mounted assembly design is mounted on the ESS. Thus, the terms upwardly and downwardly are interchanged accordingly and is just a matter of reference.

As discussed previously, the sliding lock assembly may comprise an actuator 60 that actuates on the sliding lock plate 41 between the open and closed positions. The operation of the actuator may be controlled with a control unit 100 comprising control circuitry 901, which can be of analogue or digital type, or a combination of these. The control circuitry may be connected to a user control interface (not shown) via communication interface 905. When the control circuitry receives a signal that the actuator is to be operated, the circuitry outputs a control signal or power signal directly to the actuator or to a power-regulating device (not shown). The power-regulating device may for instance be a switch providing electrical power to an electrical actuator comprising an electrical motor driving the locking mechanism, a valve for providing hydraulic fluid, or a valve providing pneumatic media providing energy for the actuation operation. The control unit may receive a signal from the operator for instance from a user interface in the vehicle cabin or a user interface located elsewhere on the vehicle, e.g. an actuation control button located at a convenient location for the operator, for instance behind the cabin of the vehicle with a good visual overview of the operation.

It should be understood that the mounting system has been described as the ESS bracket assembly is arranged on the ESS and the frame-mounted bracket assembly is arranged on the frame of the vehicle, the assemblies may be inversely arranged, i.e. the ESS bracket assembly with bump stop and cushion may be part of the frame-mounted bracket assembly and the cavity, guiding arrangement and so on mounted on ESS bracket assembly.

It is to be understood that the present invention is not limited to the embodiments described above and illustrated in the drawings; rather, the skilled person will recognize that many changes and modifications may be made within the scope of the appended claims.

The invention claimed is:

1. A mounting system for mounting at least one energy storage system (ESS) to a vehicle frame, wherein the mounting system comprises:
   at least one sliding lock assembly translatable between a closed position and an open position, the at least one sliding lock assembly comprising at least one opening arranged to receive at least one ESS bracket assembly attached to each ESS of the at least one ESS when in the open position; and
   at least one frame-mounted bracket assembly arranged to receive the at least one ESS bracket assembly and to lock the at least one ESS bracket assembly in a horizontal direction;
   wherein, when the at least one sliding lock assembly is positioned in the open position, the at least one ESS bracket assembly is translatable into a locking position in relation to the at least one frame-mounted bracket assembly, and when the at least one ESS bracket assembly is in the closed position in the at least one frame-mounted bracket assembly, the at least one sliding lock assembly is translatable into a closed position locking the at least one ESS bracket assembly in a vertical direction.

2. The mounting system of claim 1, wherein the at least one frame-mounted bracket assembly comprises a receiving cavity arranged to receive a protruding bushing of each ESS bracket assembly of the at least one ESS bracket assembly.

3. The mounting system of claim 1, further comprising an actuator arranged to move the at least one sliding lock assembly between the closed and the open positions.

4. The mounting system of claim 3, wherein the actuator is one or more of an electrically driven actuator type, a hydraulically driven actuator type, or a pneumatically driven actuator type.

5. The mounting system of claim 3, further comprising a control unit for operating the actuator.

6. The mounting system of claim 3, wherein the actuator is a manually driven actuator.

7. The mounting system of claim 1, wherein the at least one sliding lock assembly comprises a plurality of openings, each opening of the plurality of openings is configured to receive an ESS bracket assembly of the at least one ESS bracket assembly when in an open position.

8. The mounting system of claim 1, wherein the at least one frame-mounted bracket assembly comprises a guiding arrangement arranged to receive the at least one sliding lock assembly.

9. The mounting system of claim 8, wherein the at least one sliding lock assembly further comprises at least one guiding unit arranged adjacent to each opening of the at least one opening of the at least one sliding lock assembly and wherein the at least one guiding unit is arranged to fit securely in the guiding arrangement.

10. A vehicle comprising the mounting system of claim 1.

11. A method for mounting at least one energy storage system (ESS) to a vehicle frame, comprising:

placing the energy storage system under the vehicle frame, the ESS comprising at least one ESS bracket assembly;

sliding a sliding lock assembly into an open position, the sliding lock assembly comprising at least one opening arranged to receive the at least one ESS bracket assembly when in an open position;

moving the at least one ESS bracket assembly into the at least one opening of the sliding lock assembly;

moving the ESS sideways into a position above a frame-mounted bracket;

lowering the ESS so the at least one ESS bracket assembly rests on the frame-mounted bracket, wherein the frame-mounted bracket restricts the movement of the at least one ESS bracket assembly in a horizontal direction; and translating the sliding lock assembly into a closed position locking the at least one ESS bracket assembly in a vertical direction.

\* \* \* \* \*